United States Patent [19]
Iwakura et al.
[11] 4,411,699
[45] Oct. 25, 1983

[54] DESENSITIZER COMPOSITIONS

[75] Inventors: Ken Iwakura; Nobuyoshi Sekikawa, both of Minami-ashigara; Akio Miyamoto, Fujinomiya, all of Japan

[73] Assignee: Fuji Photo Film Co., Ltd., Kanagawa, Japan

[21] Appl. No.: 311,812

[22] Filed: Oct. 16, 1981

[30] Foreign Application Priority Data

Oct. 22, 1980 [JP] Japan ............................... 55-148046

[51] Int. Cl.³ ............................................ C09D 11/00

[52] U.S. Cl. .................................... 106/23; 282/27.5; 427/261; 428/320.4; 428/320.6; 428/320.8; 523/137; 523/160; 523/161; 524/105

[58] Field of Search ....................... 282/27.5; 430/964; 428/320.4, 320.6, 320.8, 913, 914; 548/347, 349, 350; 523/137, 160, 161; 524/105; 106/23

[56] References Cited

U.S. PATENT DOCUMENTS

| | | | |
|---|---|---|---|
| 4,012,538 | 3/1977 | Miyamoto et al. | 282/27.5 |
| 4,066,570 | 1/1978 | Boller et al. | 282/27.5 |
| 4,195,103 | 3/1980 | Chang | 282/27.5 |

*Primary Examiner*—J. Travis Brown

*Attorney, Agent, or Firm*—Sughrue, Mion, Zinn, Macpeak and Seas

[57] ABSTRACT

A desensitizer composition containing the amidine derivative shown by following general formula can be effectively used for partially desensitizing a developer sheet of pressure-sensitive copying papers using diphenylamine series color formers:

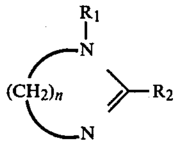

wherein $R_1$ is a hydrogen atom, an alkyl group having 1 to 20 carbon atoms, or an aryl group having 6 to 20 carbon atoms; $R_2$ is a hydrogen atom, an alkyl group having 1 to 20 carbon atoms, an aryl group having 6 to 20 carbon atoms, an amino group, or an alkylthio group having 1 to 20 carbon atoms; and n is an integer of 2 to 6; said $R_1$ and $R_2$ may have a substituent and when both $R_1$ and $R_2$ are an alkyl group, at least one of $R_1$ and $R_2$ is an alkyl group having a substituent.

6 Claims, No Drawings

DESENSITIZER COMPOSITIONS

FIELD OF THE INVENTION

This invention relates to desensitizer compositions. More particularly, the invention relates to desensitizer compositions for reducing or eliminating the function of developers capable of coloring colorless color formers.

BACKGROUND OF THE INVENTION

It has been long known that colored images can be obtained by a contact reaction of an electron donating or proton accepting colorless organic compound (hereinafter, referred to as a "color former") and an electron accepting or proton donating solid acid (hereinafter, referred to as a "developer"). Examples of the practical utilization of the foregoing phenomenon are pressure-sensitive copying papers as described in, for example, U.S. Pat. Nos. 2,505,470, 2,505,489, 2,550,471, 2,548,366, 2,712,507, 2,730,456, 2,730,457, 3,418,250 and 3,672,935 and heat sensitive recording papers as described in, for example, Japanese Patent Publication Nos. 4160/68, 7600/68 and 14039/70 and U.S. Pat. No. 2,939,009.

Furthermore, a printing method for obtaining colored images by supplying an ink containing a color former to a sheet having a coated layer of a developer is described in, for example, West German patent application (OLS) No. 1,939,962.

The developer has the property defined above and examples include clays, phenol resins, metal salts or aromatic carboxylic acids, etc.

In general, such a developer is uniformly coated over the entire surface of a support and hence a method has been widely employed wherein portions of the developer sheet which are unnecessary for recording are desensitized by coating these portions with a composition containing a desensitizer using a printing machine, etc.

Desensitizers are described in, for example, U.S. Pat. No. 2,777,780, Japanese Patent Publication Nos. 27255/69, 21448/70, 22651/71 and 29546/71, Japanese patent application (OPI) No. 32915/72 (the term "OPI" as used herein refers to a "published unexamined Japanese patent application"), Japanese patent publication Nos. 38201/72 and 4050/73, Japanese patent application (OPI) No. 6805/73, Japanese patent publication Nos. 4484/74, 19647/74, 23008/74 and 23850/74, Japanese patent application (OPI) Nos. 43708/74, 72009/74, 77709/74, 77710/74, 15513/74 and 83509/74, and West German patent application (OLS) Nos. 2,343,800, 2,359,079 and 2,361,856.

Specific examples of desensitizers are dodecyltrimethylammonium chloride, dodecylamine, 2,4,4-trimethyl-2-oxazoline, xylenediamine, polyoxyethylene alkylamine, polyoxyethylene alkyl ether, polyoxyethylene alkylphenyl ether, polyethylene glycol, polypropylene glycol, glycidyl ether addition products of amines, etc.

However, these desensitizers all have insufficient desensitizing effect and, in particular, are ineffective for diphenylmethane series color formers described in U.S. Pat. Nos. 3,193,404 and 3,278,327, Japanese patent publication No. 14873/61, Japanese patent appliation (OPI) Nos. 95420/73 and 148526/77, etc. That is, when the foregoing developer sheet coated with the desensitizer is brought into contact with a diphenylmethane series color former, the coated portions appear to be desensitized initially but colored images begin to appear with the passage of time. The desensitizing effect may be somewhat improved by increasing the amount of the desensitizer coated but in this case there is the disadvantage that when a colored ink is applied onto the surface of the desensitizer-coated portion by writing or printing, the written or printed image of the colored ink greatly fades or blurs.

Therefore, in spite of the features that the color formers are excellent in color density and the colored materials formed from the color formers are very stable as well as the cost of them is low, diphenylmethane series color formers cannot be used with conventional desensitizers, and hence the development of desensitizers showing good effect for diphenylmethane series color former has been strongly desired.

SUMMARY OF THE INVENTION

An object of this invention is, therefore, to provide a desensitizer composition which can be also used for diphenylmethane series color formers with sufficient desensitizing effect.

As the result of various investigations, it has now been discovered that the foregoing object of this invention can be attained by using a desensitizer composition containing the amidine derivative shown by following general formula (I) or the bis-compound thereof:

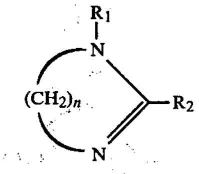

(I)

wherein $R_1$ represents a hydrogen atom, an alkyl group having 1 to 20 carbon atoms, or an aryl group having 6 to 20 carbon atoms; $R_2$ represents a hydrogen atom, an alkyl group having 1 to 20 carbon atoms, an aryl group having 6 to 20 carbon atoms, an amino group, or an alkylthio group having 1 to 20 carbon atoms; and n represents an integer of 2 to 6; and $R_1$, $R_2$ and the ring-forming methylene group may have a substituent and when both $R_1$ and $R_2$ are an alkyl group, at least one of $R_1$ and $R_2$ is an alkyl group having a substituent.

DETAILED DESCRIPTION OF THE INVENTION

In the amidine derivatives shown by foregoing general formula (I), preferred examples of alkyl groups for $R_1$ and $R_2$ are methyl, ethyl, butyl, octyl, decyl, octadecyl, etc.; preferred examples of aryl groups for $R_1$ and $R_2$ are phenyl, tolyl, etc.; preferred examples of alkylthio groups for $R_2$ are methylthio, butylthio, etc.; and preferred examples of amino groups for $R_2$ are a substituted amino groups such as monoalkylamino group, monoaralkylamino, etc., e.g., butylamino, octylamino, benzylamino, phenethylamino, etc. Further, in the substituents for these groups shown by $R_1$, $R_2$ and the ring-forming methylene group, preferred examples of substituents for the alkyl group shown by $R_1$ and $R_2$ and for the alkylthio group shown by $R_2$ are an alkoxy group such as methoxy, ethoxy, hexyloxy, etc., an aryloxy group such as phenoxy, tolyloxy, etc., an alkoxyalkyloxy group, an alkoxycarbonyl group, an amino group, a substituted amino group, an amido group, a halogen atom such as chlorine, etc.; preferred examples of substituents for the aryl group shown by $R_1$ and $R_2$ are an alkyl group, an alkoxy group, a halogen atom, etc., e.g., methyl, ethyl, chlorine atom, methoxy, ethoxy, hexyloxy, etc.; preferred examples of substituents for the amino groups shown by $R_2$ are an unsubstituted alkyl group, a substituted alkyl group, etc.; and preferred examples of substituents for the ring-forming methylene group are an unsubstituted alkyl group such as methyl, ethyl, propyl, isopropyl, butyl, etc., a substituted alkyl group, an aryl group such as phenyl, tolyl, etc.

Preferred examples of amidine derivatives or bis-compounds thereof which can be used in this invention are compounds shown by following general formulae (II), (III) and (IV):

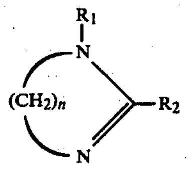
(II)

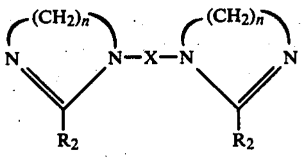
(III)

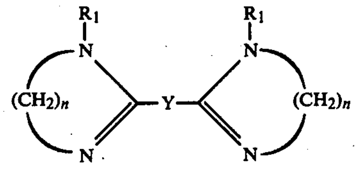
(IV)

wherein $R_1$ represents a hydrogen atom, a substituted or unsubstituted alkyl group having 1 to 20 carbon atoms, e.g., methyl, ethyl, butyl, octyl, decyl, octadecyl, etc., or an aryl group having 6 to 20 carbon atoms, e.g., phenyl, tolyl, etc.; $R_2$ represents a hydrogen atom, a substituted or unsubstituted alkyl group having 1 to 20 carbon atoms, e.g., methyl, ethyl, butyl, octyl, decyl, octadecyl, etc., an aryl group having 6 to 20 carbon atoms, e.g., phenyl, tolyl, etc., an amino group, e.g., monoalkylamino, monoaralkylamino, etc., or an alkylthio group, e.g., methylthio, butylthio, etc.; X represents $-(CH_2)_k$-A-$(CH_2)_l$-B-$(CH_2)_m$-, $-CH_2-$,

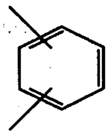 , or 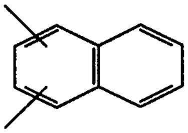

wherein A and B is >O, >NH, >$CH_2$,

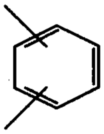 or 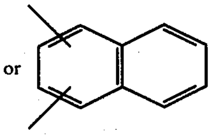 ;

and k, l, and m each is 0 or an integer of 1 to 4; Y represents $-(CH_2)_k$-A-$(CH_2)_l$-B-$(CH_2)_m-$, $-CH_2-$, $-NH(CH_2)_j-NH-$,

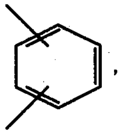 , or 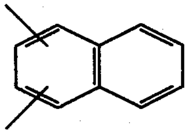

wherein A and B each is >O, >NH, >$CH_2$,

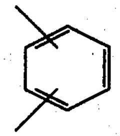 , or 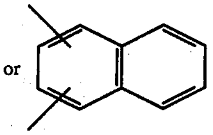 ;

k, l, and m each is 0 or an integer of 1 to 4; and j is an integer of 1 to 12; and the substituent for the ring-forming methylene group is an alkyl group having 1 to 4 carbon atoms such as methyl, ethyl, propyl, isopropyl, butyl, etc., or a phenyl group.

Preferred examples of $R_1$ in foregoing general formulae (II), (III) and (IV) are an alkyl group having 1 to 12 carbon atoms, an aralkyl group, an aryloxyalkyl group, an alkoxyalkyl group, etc.; preferred examples of X are $-(CH_2)_p-$ wherein p is an integer of 1 to 6, $-(CH_2)_qNH(CH_2)_q-$ wherein q is an integer of 1 to 4,

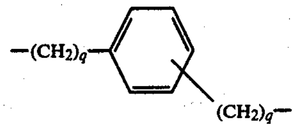

wherein q is an integer of 1 to 4, $-(CH_2)_p$-O$(CH_2)_p-$ wherein p is an integer of 1 to 6, etc.; preferred examples of $R_2$ are an alkyl group having 1 to 8 carbon atoms, an aralkyl group, a phenyl group, an alkylamino group, an aralkylamino group, an alkylthio group, etc., preferred examples of Y are $-(CH_2)_p-$ wherein p is an integer of 1 to 6,

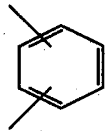 , $-NH-(CH_2)_r-NH-$ wherein r is an integer of 1 to 8; and preferred examples of substituents for the ring-forming methylene group are alkyl group having 1 to 4 carbon atoms.

In foregoing amidine derivatives, when both $R_1$ and $R_2$ are unsubstituted alkyl groups, the solubility in water thereof increases if the total number of carbon atoms of the substituents is less than 9 and thus the desensitizer composition is inapplicable for wet-offset printing utilizing the repelling property to fountain solution. Also, if the total number of carbon atoms in the substituents is more than 10, the desensitizing effect of the amidine derivatives greatly decreases.

When $R_1$ and $R_2$ are a hydrogen atom, substituted alkyl groups such as aralkyl groups, alkoxyalkyl groups, aryloxyalkyl groups, substituted aminoalkyl groups, etc., the amidine derivative exhibit sufficient desensitizing effect.

The amidine derivative used in this invention can be prepared by known methods as described below:

(1)

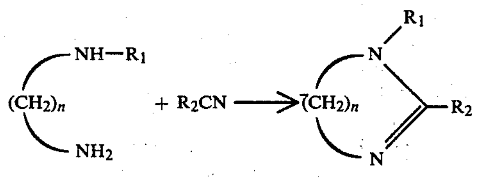

(2)

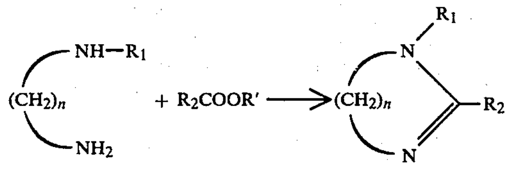

(3)

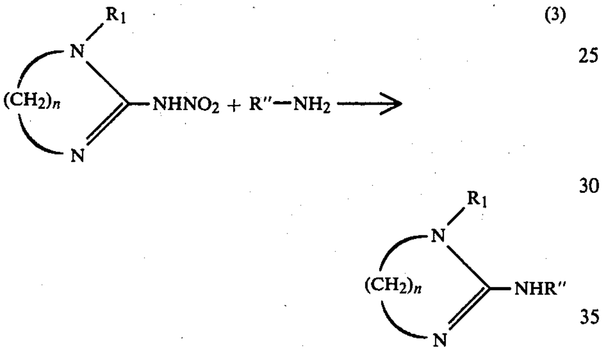

(4)

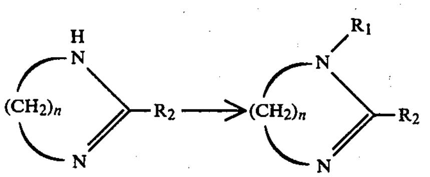

Method (1) is a method of preparing the amidine derivative by reaction of the corresponding diamine compound and nitrile (e.g., as disclosed in *Nippon Kagaku Zasshi,* Vol. 89, No. 8, 780–784 (1968) and U.S. Pat. No. 2,505,247); method (2) is a method of preparing the amidine derivative by reaction of the corresponding diamine compound and an ester (e.g., as disclosed in *J. Am. Chem. Soc.,* Vol. 69, 822–825 (1939) and ibid., Vol. 61, 3195–3197 (1939)); method (3) is a method of preparing the amidine derivative by reacting a 2-nitroaminoamidine derivative and an amine to introduce a substituted amino group into the 2-position thereof (e.g., as disclosed in *J. Am. Chem. Soc.,* Vol. 71, 766–770 (1949)); and method (4) is a method of preparing the amidine derivative by introducing a substituent to the 1-position of the corresponding amidine derivative using an alkylating agent or an arylating agent.

Specific examples of the amidine derivatives of this invention are illustrated below but the invention is not limited to them:

1-dodecylimidazoline,
2-dodecylimidazoline,
2-phenylimidazoline,
2-(β-phenethyl)imidazoline,
2-(α-naphthyl)imidazoline,
2-(p-tolyl)imidazoline,
2-(p-anisyl)imidazoline,
2-octylaminoimidazoline,
2-(β-phenethylamino)imidazoline,
2-octylthioimidazoline,
1,4-bis{imidazolinyl-(2)}benzene,
1,3-bis{imidazolinyl-(2)}benzene,
1,4bis{imidazolinyl-(2)}butane,
1,6-bis{imidazolinyl-(2)}hexane,
2-decyl-4-methylimidazoline,
1-benzyl-2-undecyl-4-methylimidazoline,
1-benzyl-2,4-dimethylimidazoline,
2-phenyl-4-methylimidazoline,
2-(α-naphthyl)-4-methylimidazoline,
1,4-bis{4-methylimidazolinyl-(2)}benzene,
1,3-bis{4-methylimidazolinyl-(2)}benzene,
1,4-bis{4-phenylimidazolinyl-(2)}benzene,
1,4-bis{1-benzylimidazolinyl-(2)}benzene,
2,4,5-tributylimidazoline,
1-decyl-2,4-dimethylimidazoline,
1-benzyl-2-phenyl-4-methylimidazoline,
1,3-bis{4,5-dimethylimidazolinyl-(2)}benzene,
2-benzyl-4-methylimidazoline,
1,2-dibenzylimidazoline,
1-butyl-2-phenylimidazoline,
1-hexyl-2-phenylimidazoline,
1-octyl-2-phenylimidazoline,
1-benzyl-2-phenylimidazoline,
1-decyl-2-methylimidazoline,
1-(2-phenoxyethyl)-2-methylimidazoline,
1-(2-phenoxyethyl)-2-phenylimidazoline,
1-(2-butoxyethyl)-2-phenylimidazoline,
1-(2-diethylaminoethyl)-2-phenylimidazoline,
1-(6-benzylaminohexyl)-2-methylimidazoline,
1-{2-(2-ethoxy)ethoxyethyl}-2-phenylimidazoline,
1-(β-phenethyl)-2-ethyl-4-methylimidazoline,
1-methyl-2-benzyl-4-methylimidazoline,
1,2-bis{2-benzylimidazolinyl-(1)}ethane,
1,2-bis{2-phenylimidazolinyl-(1)}ethane,
1,6-bis{2-phenylimidazolinyl-(1)}hexane,
1,4-bis{2-phenyl-4-methylimidazolinyl-(1)}butane,
bis-2-{2-phenylimidazolinyl-(1)}ethylamine,
bis-2-{2-phenylimidazolinyl-(1)}ethyl ether,
α,α'-bis{2-phenylimidazolinyl-(1)}-p-xylene,
α,α'-bis{2-benzylimidazolinyl-(1)}-p-xylene,
N,N'-bis-2-{2-benzylimidazolinyl-(1)}ethylethylenediamine,
1-octyl-2-(β-phenethyl)tetrahydropyrimidine,
1-methyl-2-benzyl-4-methyltetrahydropyrimidine,
1,4-bis{tetrahydropyrimidyl-(2)}benzene,
1,4-bis{tetrahydropyrimidyl-(2)}butane,
1,2-bis{2-benzyltetrahydropyrimidyl-(1)}ethane, and
2-phenyltetrahydropyrimidine.

The desensitizer composition of this invention is a composition containing the foregoing amidine derivative or the bis-compound thereof as the desensitizer component together with, if desired, other desensitizers and various additives. The proportion of the foregoing desensitizer of this invention in the desensitizer composition of this invention is 5 to 60% by weight, preferably 15 to 50% by weight.

Various additives which can be used in the desensitizer composition of this invention are the materials for general inks described in detail in Chapters 2–9 of E. A. Apps, *Printing Ink Technology,* Leonard Hill, London (1961). Specific examples of these additives are natural or synthetic high molecular weight compounds such as a ketone resin, a polyamide resin, a maleic acid resin, a phenol resin, an epoxy resin, an alkyd resin, a melamine resin, a urea resin, polyvinyl alcohol, gelatin, shellac, etc., e.g., incorporated in the desensitizer composition in an amount of 0 to 40%, preferably 5 to 25% by weight; pigments such as titanium dioxide, barium sulfate, calcium carbonate, talc, kaolin, bentonite, organic bentonite, etc., with basic pigments such as magnesium oxide, calcium carbonate, etc., being preferred, and with the pigments incorporated in the desensitizer composition in an amount of, e.g., 0 to 50%, preferably 0.3 to 40% by weight; vegetable oils such as linseed oil, tung oil, soybean oil, cotton seed oil, and the thermal polymerization products thereof, incorporated in the desensitizer composition in an amount of 0 to 50%, preferably 0 to 20% by weight; waxes such as paraffin wax, microcrystalline wax, carnauba wax, etc., e.g., incorporated in the desensitizer composition in an amount of 0 to 10%, preferably 0 to 5% by weight, and set-off preventing agents such as starch, dextrin, etc., e.g., incorporated in the desensitizer composition in an amount of 0 to 10%, preferably 0 to 5% by weight.

The desensitizer composition of this invention can be prepared by mixing the components as described above and dissolving the mixture, if necessary, followed by kneading the mixture by a three-roll type roll mill, kneader, etc.

The desensitizer composition of this invention can be coated by printing on a developer sheet using a letterpress printing machine, a dry offset printing machine, a wet offset printing machine, etc.

The coated amount of the desensitizer composition is about 0.8 to 10.0 $g/m^2$, preferably 1.5 to 6.0 $g/m^2$.

Specific examples of the developers for which the desensitizer composition of this invention is effective are clays (e.g., acid clay, active clay, attapulgite, kaolin, etc.), phenol resins, metal salts of aromatic carboxylic acids, etc.

The phenol resins described above include phenol-aldehyde polymers (so-called novolak resins) and phenol-acetylene polymers.

The metal salts of aromatic carboxylic acids used in this invention are described in, for example, U.S. Pat. Nos. 3,864,146 and 3,983,292, Japanese patent application No. 25158/78, etc.

An aromatic carboxylic acid having a hydroxy group at the ortho-position or para-position to the carboxy group is preferred as the aromatic carboxylic acid in the foregoing metal salts of aromatic carboxylic acid and salicylic acid derivatives are preferred, in particular, salicylic acid derivatives with substituents such as alkyl groups, aryl groups, aralkyl groups, etc., in at least one of the ortho-position and para-position to the hydroxy group, the total number of carbon atoms in the substituent being larger than 8 are particularly preferred.

Also, preferred metals for forming the above-described metal salts of aromatic carboxylic acids are zinc, tin, aluminum, etc., and among them, zinc is most effective.

The developer is coated on a support such as a paper, etc., together with a binder such as a styrene-butadiene latex.

The desensitizer composition of this invention can be effectively employed for diphenylmethane series color formers the desensitization of which has hitherto been difficult using conventional desensitizers. However, the desensitizer composition of this invention is applicable to other color formers with sufficient effect.

Specific examples of these color formers are diphenylmethane series compounds such ad bis(4-dimethylaminophenyl)-(p-toluenesulfonyl)methane, bis(4-dimethylaminophenyl)benzenesulfonylmethane, bis(4-dimethylaminophenyl)-(4-dodecylbenzenesulfonyl)methane, bis(4-dimethylaminophenyl)-(3-nitro-4-methylbenzenesulfonyl)methane, oxime ether compounds of Michler's hydrol described in Japanese patent application (OPI) No. 148526/77, bis(4-dimethylaminophenyl-)anilinomethane, bis(4-dimethylaminophenyl)-(p-chloroanilino)methane, etc.; triarylmethane series compounds such as 3,3-bis(p-dimethylaminophenyl)-6-dimethylaminophthalide, 3-bis(1,2-dimethylindol-3-yl)-5-dimethylaminophthalide, etc.; xanthene series compounds such as Rhodamine B-anilinolactam, 3-dimethylamino-7-methoxyfluoran, etc.; thiazine series compounds such as Benzoyl Methylene Blue, p-nitrobenzyl Leucomethylene Blue, etc.; and spiro series compounds such as 3-methyl-spiro-dinaphthopyran, 3-propyl-spirobenzopyran, etc.

The color former is dissolved in a solvent, encapsulated, and, then, is coated on a support or is coated on a support as a dispersion in a binder solution.

Natural or synthetic oils may be used alone or as a combination thereof as the solvent. Specific examples of solvents are cotton seed oil, kerosene, paraffin, naphthene oil, alkylated biphenyls, alkylated terphenyls, chlorinated paraffin, alkylated naphthalenes, etc. For preparing the microcapsules of the color former, methods utilizing the coacervation of hydrophilic colloid sol as described in U.S. Pat. Nos. 2,800,457 and 2,800,458, and the interfacial polymerization methods described in British Pat. Nos. 867,797, 950,443, 989,264 and 1,091,076 can be utilized.

The invention is further explained by reference to the following examples, in which all parts are by weight.

EXAMPLES

The effect of the desensitizer composition of this invention was demonstrated using the following developer sheet and color former sheet.

Preparation of Developer Sheet

Into 800 parts of wate was dispersed 200 parts of active clay and then the pH of the dispersion was adjusted to 10.0 with an aqueous 20% sodium hydroxide solution. To the dispersion were added 40 parts (on a solids basis) of a styrene-butadiene copolymer latex containing 60% styrene and 60 parts of an aqueous 10% starch solution to provide a liquid coating composition. A base paper of 50 $g/m^2$ was coated with the coating composition at a coverage of 6 $g/m^2$ on a solids content basis to provide a developer sheet.

Preparation of Color Former Sheet

An emulsion was prepared by adding 10 parts of acid-treated gelatin having an isoelectric point of 8.0 and 10 parts of gum arabic to 60 parts of water at 40° C. and after adding thereto 0.2 part of sodium alkylbenzenesulfonate, 50 parts of a color-former-containing oil was emulsified therein.

The color former oil used above was prepared by dispersing 2.5% by weight Crystal Violet Lactone, 1.0% by weight bis(4-dimethylaminophenyl)-(4-dodecylbenzenesulfonyl)methane, and 2.0% by weight Benzyl Leucomethylene Blue in an oil of 4 parts of diisopropylbiphenyl and 1 part of kerosene.

When the average size of the emulsified droplets became 8 microns, 100 parts of water of 40° C. was added to the emulsion to stop the progress of the emulsification.

While stirring the emulsion, 210 parts of water of 30° C. was further added thereto and the pH of the system was adjusted to 4.4 by the addition of 20% hydrochloric acid. While further stirring the mixture, the mixture was cooled to 8° C. and then 1.5 parts of 20% glutaraldehyde was added to the mixture.

Thereafter, 30 parts of an aqueous 10% carboxymethyl starch solution was added and after adjusting the pH thereof to 8.5 by adding dropwise an aqueous 25% sodium hydroxide solution, the resultant mixture was heated to 30° C., thereby microcapsules having hardened walls were obtained.

In the mixture was dispersed 10 parts of cellulose floc and the dispersion was coated on a paper of 40 g/m² at a coverage of 6 g/m² and dried to provide a color former sheet.

Preparation of Desensitizer Composition

To 40 parts of the propylene oxide addition product of ethylenediamine (12 moles of propylene oxide) was added 15 parts of a rosin-denatured maleic acid resin (softening point of 120° C. and acid value of 30) and the mixture was heated to 170° C. for one hour to dissolve the resin. To the solution were added 20 parts of the desensitizer (shown in Table 1) and 20 parts of titanium dioxide and the mixture was kneaded in a three-roll type roll mill to provide a desensitizer composition.

Test Procedure

Each of the desensitizer compositions prepared in the above step was coated on the surface of the foregoing developer sheet by printing at 3.0 g/m² (solids basis). The developer sheet was superposed on the color former sheet prepared in the above step so that the portion coated with the desensitizer composition faced the color former layer and a load press of 600 kg/m² was applied on the assembly to achieve coloration. Then, the reflective visual density was measured using a densitometer (RD 514 type, made by Macbeth Co.) and the sensitizing effect was evaluated. Furthermore, the samples thus-treated were allowed to stand in the dark for one month and then the visual density was measured by the same manner as above. The results obtained are shown in Table 1.

TABLE 1

| | Desensitizer | Desensitizing Effect (visual density) Directly after Coloration | 1 Month after Coloration |
|---|---|---|---|
| Example 1 | 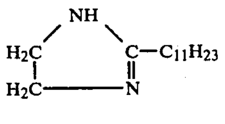 | 0.06 | 0.06 |

TABLE 1-continued

| | Desensitizer | Desensitizing Effect (visual density) Directly after Coloration | 1 Month after Coloration |
|---|---|---|---|
| Example 2 | 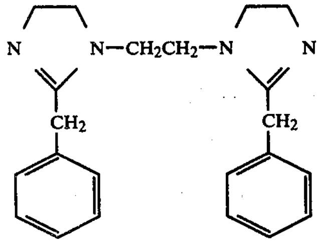 | 0.05 | 0.05 |
| Example 3 | 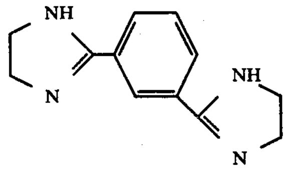 | 0.05 | 0.05 |
| Example 4 | 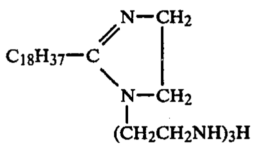 | 0.06 | 0.06 |
| Example 5 | 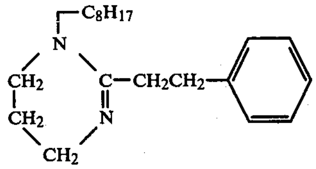 | 0.06 | 0.06 |
| Comparison | Addition Product of Ethylenediamine (12 moles of propylene oxide) | 0.08 | 0.43 |

The usefulness of the desensitizer compositions of this invention is clear from results in Table 1. The numeral values in the table show the desensitization effect, the lower the value the higher desensitizing effect. A value lower than 0.06 shows the developer sheet to be completely desensitized. In the case of the conventional desensitizer shown in the comparison example, it may show a somewhat low desensitizing effect directly after coating the desensitizer composition but coloration appears with the passage of time and eventually, a desensitizing effect is not obtained with conventional desensitizer. On the other hand, in the case of the compounds of this invention, colored image does not appear directly after the coloring operation but also with the passage of time, which shows the compounds are very excellent desensitizers.

While the invention has been described in detail and with reference to specific embodiments thereof, it will be apparent to one skilled in the art that various changes and modifications can be made therein without departing from the spirit and scope thereof.

What is claimed is:

1. A desensitizer composition comprising:

(a) a bis-compound of an amidine derivative represented by the formula (III) or (IV):

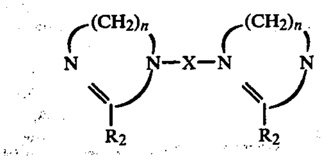

(III)

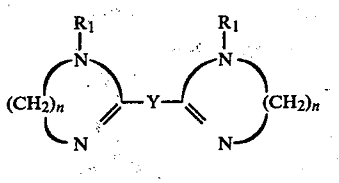

(IV)

wherein $R_1$ represents a hydrogen atom, a substituted or unsubstituted alkyl group having 1 to 20 carbon atoms, or an aryl group having 6 to 20 carbon atoms; $R_2$ represents a hydrogen atom, a substituted or unsubstituted alkyl group having 1 to 20 carbon atoms, an aryl group having 6 to 20 carbon atoms, an amino group, or an alkylthio group; X represents $-(CH_2)_k-A-(CH_2)_l-B-(CH_2)_m-$, $-CH_2-$,

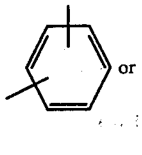 or 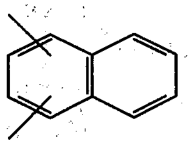

wherein A and B each is >O, >NH, >$CH_2$,

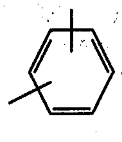 or 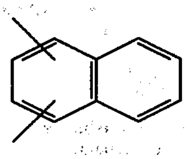

and k, l, and m each is 0 or an integer of 1 to 4; Y represents $-(CH_2)_k-A-(CH_2)_l-B-(CH_2)_m-$, $-CH_2-$, $-NH(CH_2)_j-NH-$,

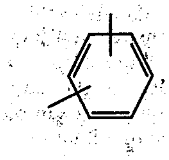, or 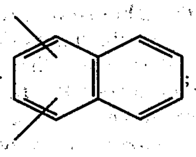;

wherein A and B each is >O, >NH, >$CH_2$,

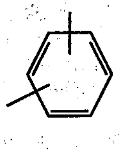 or 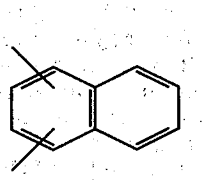

k, l and m each is 0 or an integer of 1 to 4; and j is an inter of 1 to 12; and wherein the ring-forming methylene group may be substituted with an alkyl group having 1 to 4 carbon atoms or a phenyl group;

(b) a synthetic or natural high molecular weight compound as a binder; and (c) a pigment.

2. The desensitizer composition of claim 1, wherein $R_1$ is an alkyl group having 1 to 12 carbon atoms, an aralkyl group, an aryloxyalkyl group, or an alkoxyalkyl group, X is $-(CH_2)_p-$ wherein p is an integer of 1 to 6, $-(CH_2)_qNH(CH_2)_q-$ wherein q is an integer of 1 to 4,

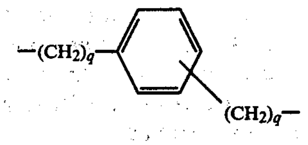

wherein q is an integer of 1 to 4, or $-(CH_2)_p-O-(CH_2)_p-$ wherein p is an integer of 1 to 6; $R_2$ is an alkyl group having 1 to 8 carbon atoms, an aralkyl group, a phenyl group, an alkylamino group, an aralkylamino group or an alkylthio group, and Y is $-(CH_2)_p-$ wherein p is an integer of 1 to 6,

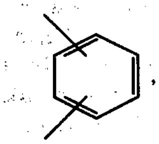, $-NH-(CH_2)_r-NH-$ wherein r is an integer of 1 to 8; and the alkyl group is a substituent on the ring-forming methylene group is an alkyl group having 1 to 4 carbon atoms.

3. The desensitizer composition of claim 1 wherein said amidine derivative or bis-compound thereof of the formula (II), (III) or (IV) is selected from the group consisting of 1,4-bis{imidazolinyl-(2)}benzene, 1,3-bis-{imidazolinyl-(2)}benzene, 1,4-bis{imidazolinyl-(2)}butane, 1,6-bis{imidazolinyl-(2)}hexane, 1,4-bis{4-methylimidazolinyl-(2)}benzene, 1,3-bis{4-methylimidazolinyl-(2)}benzene, 1,4-bis{4-phenylimidazolinyl-(2)}benzene, 1,4-bis{1-benzylimidazolinyl-(2)}benzene, 1,2-bis{2-benzylimidazolinyl-(1)}ethane, 1,2-bis{2-phenylimidazolinyl-(1)}ethane, 1,2-bis{2-phenylimidazolinyl-(1)}hexane, 1,4-bis{2-phenyl-4-methylimidazolinyl-(1)}butane, bis-2-{2-phenylimidazolinyl-(1)}ethylamine, bis2-{2-phenylimidazolinyl-(1)}ethyl ether, α,α'-bis{2-phenylimidazolinyl-(1)}-p-xylene, αα'-bis{2-benzylimidazolinyl-(1)}-p-xylene, N,N'-bis-2-{2-benzylimidazolinyl-(1)}ethylethylenediamine, 1,4-bis{tetrahydropyrimidyl-(2)}benzene, 1,4-bis{tetrahydropyrimidyl-(2)}-butane, 1,2-bis{2-benzyltetrahydropyrimidyl-(1)}ethane, and 2-phenyl tetrahydropyrimidine.

4. A desensitizer composition comprising:

(a) an amidine derivative represented by formula (II)

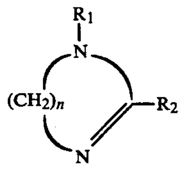

(II)

wherein $R_1$ is a hydrogen atom, or a substituted or unsubstituted alkyl group having 1 to 5 carbon atoms, $R_2$ is an aralkyl group having 7 to 20 carbon atoms, or a substituted or unsubstituted aryl group and n is an integer of 2 to 6;

(b) a natural or synthetic high molecular weight compound as a binder; and (c) a pigment.

5. The desensitizer composition of claim 4 wherein said amidine derivative of the formula, (II), is present in the desensitizer composition in an amount of 5 to 60% by weight based on the total composition weight.

6. The desensitizer composition of claim 1 wherein said bis-compound of formula III or IV is present in the desensitizer composition in an amount of 5 to 60% by weight based on the total composition weight.

* * * * *